US007275085B1

(12) United States Patent
Tran (10) Patent No.: US 7,275,085 B1
(45) Date of Patent: Sep. 25, 2007

(54) METHOD AND APPARATUS FOR MAINTAINING STATE INFORMATION FOR WEB PAGES USING A DIRECTORY SERVER

(75) Inventor: Trung Minh Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 09/550,181

(22) Filed: Apr. 14, 2000

(51) Int. Cl.
*G06F 15/16* (2006.01)

(52) U.S. Cl. ............ 709/217; 709/219; 709/225; 709/229; 707/10; 715/505

(58) Field of Classification Search ............ 709/225, 709/229, 217, 219; 715/505–508; 707/10
See application file for complete search history.

(56) References Cited

U.S. PATENT DOCUMENTS

| | | | | |
|---|---|---|---|---|
| 5,404,294 A * | 4/1995 | Karnik | .......... | 715/507 |
| 5,835,712 A * | 11/1998 | DuFresne | .......... | 709/203 |
| 5,838,928 A * | 11/1998 | Terashima | .......... | 709/250 |
| 6,012,083 A * | 1/2000 | Savitzky et al. | .......... | 709/202 |
| 6,016,484 A * | 1/2000 | Williams et al. | .......... | 705/39 |
| 6,052,710 A * | 4/2000 | Saliba et al. | .......... | 709/203 |
| 6,088,700 A * | 7/2000 | Larsen et al. | .......... | 707/10 |
| 6,154,738 A * | 11/2000 | Call | .......... | 707/4 |
| 6,199,079 B1 * | 3/2001 | Gupta et al. | .......... | 715/507 |
| 6,297,819 B1 * | 10/2001 | Furst | .......... | 345/733 |
| 6,366,947 B1 * | 4/2002 | Kavner | .......... | 709/203 |
| 6,438,592 B1 * | 8/2002 | Killian | .......... | 709/224 |
| 6,505,201 B1 * | 1/2003 | Haitsuka et al. | .......... | 707/10 |
| 6,594,692 B1 * | 7/2003 | Reisman | .......... | 709/219 |

* cited by examiner

*Primary Examiner*—Saleh Najjar
*Assistant Examiner*—Liang-che Alex Wang
(74) *Attorney, Agent, or Firm*—Duke W. Yee; Jeffrey S. LaBaw; Betty Formby (57) ABSTRACT

An apparatus, system and method for maintaining Web page state information using a directory server. A directory server stores information for each Web page visited by a user that requires user input. When the Web page is again visited by the user, the information is retrieved from the directory server and inserted into the Web page in appropriate fields based on tags in the Web page document. Thus, the user need not repeatedly re-enter information already entered into the Web page. However, if the user wants to enter new values, the new values will replace the existing ones stored in the directory server.

38 Claims, 4 Drawing Sheets

FIG. 1

Sign Up Now/Availability

First: Check to see if AT&T@Home is available in your neighborhood. Please enter your address below.

Fields highlighted in blue are required for this form to function correctly. Please fill out all highlighted fields.

- First Name: [　　　　　]
- Last Name: [　　　　　]
- Street Number: [　　　]
- Direction: [None ▼]
- Street: [　　　　　　]
- Street Type: [Select... ▼]
- Apt: [　　　]
- City: [　　　　　]
- State: [　　　　　▼]
- Zip Code: [　　　]

[ Next ]

| ATTRIBUTE | VALUE |
|---|---|
| USER ID | TRAN@LPTR.COM |
| PN | WWW.IBM.COM |
| NO. | 2 |
| AN | REGISTER.HTML |
| SOC SEC | 999-46-5699 |
| DOB | 021775 |
| EMAIL | TRAN@GES.COM |
| . | . |
| . | . |
| . | . |

METHOD AND APPARATUS FOR MAINTAINING STATE INFORMATION FOR WEB PAGES USING A DIRECTORY SERVER

FIELD OF THE INVENTION

The present invention is directed to a method and apparatus for maintaining state information for Web pages using a directory server.

BACKGROUND OF THE INVENTION

The Internet is fast becoming the most prevalent tool through which goods and services are marketed to customers. The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information.

Each logical block of information accessible to a client, called a "page" or a "Web page", is identified by a URL. The URL provides a universal, consistent method for finding and accessing this information, not necessarily for the user, but mostly for the user's Web "browser." A browser is a program capable of submitting a request for information identified by an identifier, such as, for example, a Universal Resource Locator (URL). A user may enter a domain name through a Graphical User Interface (GUI) for the browser to access a source of content. The domain name is automatically converted to the Internet Protocol (IP) address by a Domain Name System (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

In marketing goods and services, often companies require that the users enter personal information for their records and to effectuate a sale of goods or services. Such information is usually entered via a Web page having fields denoted by HTML tags, such as the <FORM> tag.

Figure 1:
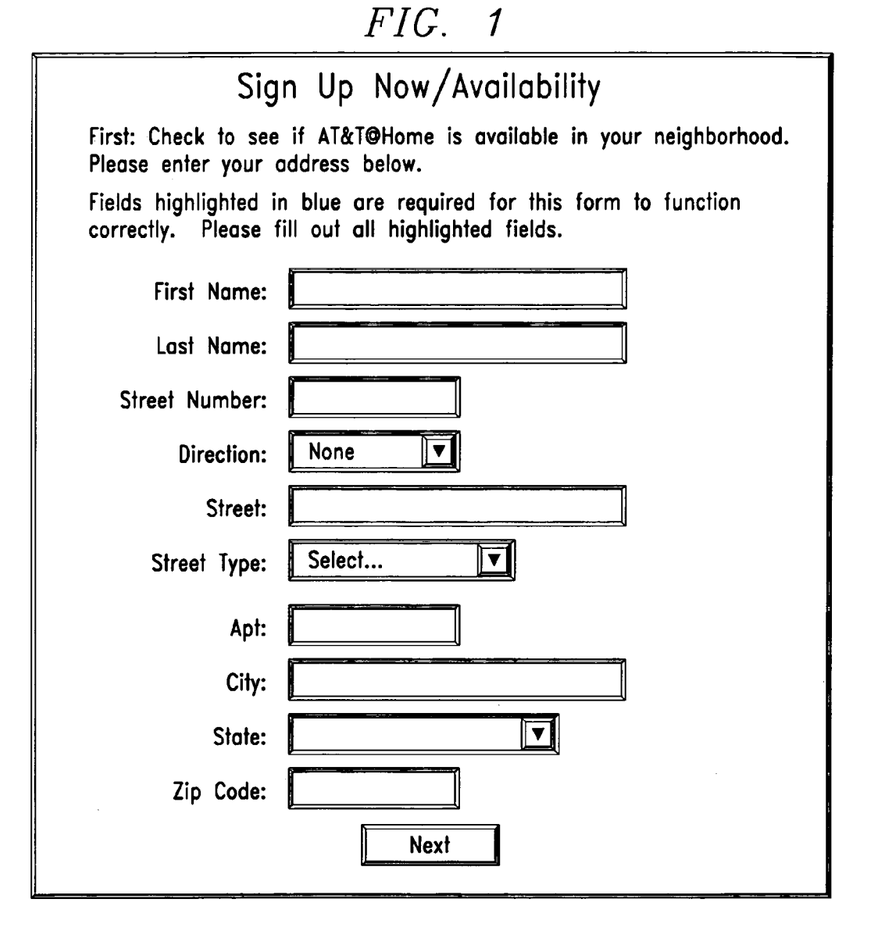
FIG. 1 is an exemplary diagram of a typical Web page having fields for a user to enter personal information.

FIG. 1 is an example Web page having fields in which a user may enter personal information for use by the Web server. As shown in FIG. 1, the Web page has fields for entry of the user's name and address. Once the user enters the information in the required fields, the information is sent to the Web page server for processing. The information transmission to the Web page server is accomplished when the user sends a "transmit" command via the user's Web browser. This may be done, for example, by selecting a virtual "enter" button or "next" button on the Web page display.

The ability of Web servers to maintain state information for a Web page is very limited in that state information typically can only be passed from one Web page to the next immediate Web page. Maintaining state information means remembering information while the user moves from Web page to Web page within a Web site. If a user moves beyond the next Web page to another Web page in the Web site, the state information for the first Web page will be lost. Thus, the user is required to reenter all of the information previously entered.

There are some possible ways of maintaining state information for longer periods of time. The state information may be stored as cookies on the user's personal computer. Cookies are data created by a Web server that provides a way for a Web site to keep track of a user's patterns and preferences and, with the cooperation of a Web browser, to store them on the user's own hard disk.

The cookies contain a range of URLs (addresses) for which they are valid. When the browser encounters those URLs again, it sends those specific cookies to the Web server. For example, if a user's ID were stored as a cookie, it would save that person from typing in the same information all over again when accessing that service for the second and subsequent time.

Cookies, however, have the drawbacks that cookies are only valid for certain dates, i.e. cookies expire. If a cookie expires or is otherwise disabled, such as through a setting in the Web browser, the information stored in the cookie cannot be used.

In addition, cookies are limited in their size and are not valid across Web browsers. In other words, a cookie that is created using Netscape™ will not be valid for use with Microsoft Internet Explorer™. The most significant drawback is that cookies are stored in an unencrypted format. Thus, sensitive information, such as credit card numbers, social security numbers, and the like, which are typical information provided during Internet sales, would not be secure when stored in a cookie.

Another option is to encode the state information in the URL. The URL is an address that defines the route to a file on the Web or any other Internet facility. URLs are typed into the browser to access Web pages, and URLs are embedded within the pages themselves to provide the hypertext links to other pages.

For example, a URL such as "www.techweb.com/encyclopedia/defineterm?term=URL" may be utilized to temporarily store Web page state information. The term "defineterm?term=" provides the attribute that is stored in the URL with "URL" being the user entered state attribute value. The drawback to using this approach is that the state information is maintained only temporarily and is lost when the user moves to another Web page.

A still further option is to store the Web page state information on the Web server. This requires that each Web server provide sufficient storage capacity to store Web page state information for each user of each Web page. Additionally, it requires the Web server to have a Common Gateway Interface (CGI) script for interfacing with a Web server database. A CGI is a small program written in a script language, such as Perl, that functions as the glue between HTML Web pages and other programs on the Web server. For example, a CGI script allows search data entered on a Web page to be sent to a database management system (DBMS). It also formats the results of that search onto an HTML Web page, which is sent back to the user.

Thus, storing the Web page state information on the Web server greatly increases the complexity, storage requirements, and ultimately the cost of a Web server. Additionally, the client applications on the user's computer cannot maintain control over the use of the Web page state information or utilize this information with other Web pages.

Therefore, it would be beneficial to have a method and apparatus for maintaining state information for Web pages that is secure and does not require a Web server for storage of the Web page state information.

SUMMARY OF THE INVENTION

The present invention is directed to an apparatus, system and method for maintaining Web page state information even when the user moves from Web page to Web page. The present invention also provides an apparatus, system and method for storing Web page state information in a form that is secure and portable between a plurality of Web browser applications.

With the present invention, a user's request for a Web page is used to send a background request for Web page information from a directory server. The directory server stores Web page state information for every Web page visited by the user that requires a user's input. If the requested Web page information is stored in the directory server, the Web page information is downloaded to the user's client device and inserted into the received Web page at the appropriate fields in the Web page. This may be performed, for example, based on HTML tags, or the like.

If the Web page information is not stored in the directory server, the user's client device sends an instruction to the directory server to create a new Web page entry and to store the user's input into the Web page, in the new Web page entry of the directory server.

In another embodiment, the directory server stores a master directory listing for the user that includes information common to a plurality of Web pages. In addition, the directory server may also store individual Web page entries that contain information not already stored in the master directory listing. When a request for Web page information is received, the directory server downloads both the master directory listing and the Web page entry to the requesting data processing system. The information is then inserted into the proper fields of the retrieved Web page based on, for example, HTML tags in the Web page document.

Other features and advantages of the present invention will be described in, or will be apparent to those of ordinary skill in the art in view of, the following description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 2:
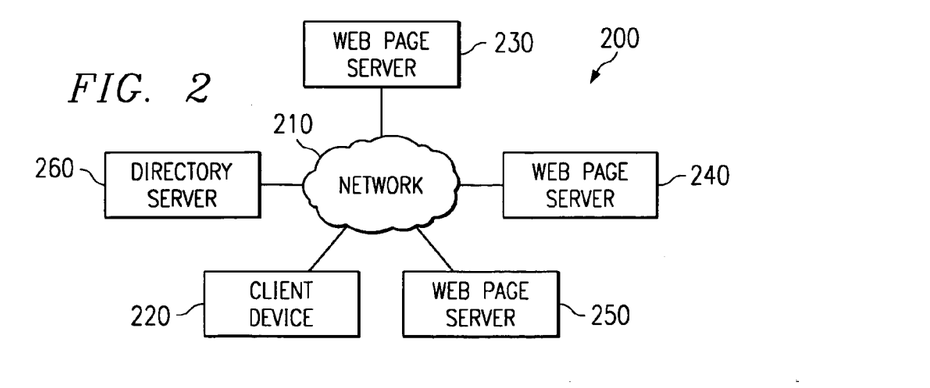
FIG. 2 is an exemplary diagram of a distributed data processing system in which the present invention may be implemented.

FIG. 2 is an exemplary diagram illustrating a distributed data processing system in which the present invention may be implemented. As shown in FIG. 2, the system 200 includes a network 210, at least one client device 220, a plurality of Web page servers 230-250 and at least one directory server 260.

The network 210 may be any type network that facilitates the transmission of data from one computing device to another. For example, the network 210 may be a Local Area Network (LAN), Wide Area Network (WAN), an Intranet, the Internet, or the like. Additionally, the network 210 may be any combination of the above networks. In the depicted example, distributed data processing system 200 is the Internet, with network 210 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages.

The client device 220 sends and retrieves information to the Web page servers 230-250 via the network 210. The client device 220 may be any type of computing device capable of transmitting and receiving data over the network 210. For example, the client device 220 may be a personal computer, portable computer with a wired or wireless modem, Personal Digital Assistant (PDA), a Web TV™ device, Internet capable telephone or pager, and the like. The client device 220 retrieves Web pages from the Web page servers 230-250, sends data to the Web page servers 230-250, and sends and retrieves data to and from the directory server 260, as will be described hereafter.

The Web page servers 230-250 are computing devices configured to act as server devices in conjunction with network 210. The Web page servers 230-250 store Web pages that may be downloaded by the client device 220. Additionally, the Web page servers 230-250 may be capable of receiving data from the client device 220 for processing.

The directory server 260 may be any type of directory server that stores directory entries corresponding to the client device 220. For example, the directory server 260 may be a Lightweight Directory Access Protocol (LDAP) server or Microsoft Active Directory Server.

The directory entries include information for each Web page downloaded by the client device 220 through which the client device 220 sent user information to the Web page server. The information stored in the directory entry may be used at a later time. For example, the directory entry information may be used when accessing the same Web page again to insert the previously entered user information into the appropriate fields of the Web page, or when accessing a different Web page that requires the information. In this way, the present invention eliminates the need for the user to repeat entry of the user information when the user has either moved to other Web pages or has not visited the Web page for some time.

In a preferred embodiment, the present invention is implemented by an application running in the background of a Web browser used by the client device 220 to connect to the Web page servers 230-250 and download Web pages from the Web page servers 230-250. This application may be, for example, a plug-in application to a Web browser or may be a separate application that is run through multi-tasking in a multi-tasking environment such as Windows 98™ or the like.

When the client device 220 connects to a Web page server 230, for example, and sends a request to download a Web page, the identification of the requested Web page is also sent to the directory server 260 via the background application. The directory server 260 searches the directory entries for an entry matching the client device 220 and the requested Web page. If a matching entry is not found, the user of the client device 220 must enter the required information in the fields of the Web page as in the conventional sense.

With the present invention, however, the information entered by the user is not only sent to the Web page server 230 when the user sends a transmit command, but is also sent to the directory server 260 through the background application. The directory server then establishes a directory entry corresponding to the client device 220, the particular Web page, and the attributes and attribute values, i.e. the information entered by the user, as will be described in further detail hereafter.

Some information entered by the user may be personal information that is to be kept secret. In this case, the information may be encrypted and stored in an encrypted form (or BINARY attribute) in the directory server 260. Whether or not to encrypt information may be determined based on a setting selected by the user through a Web browser, an HTML tag type, or the like. Information stored in the directory server 260 in an encrypted form may be retrieved and inserted into the Web page in either an encrypted or decrypted form.

If an entry in the directory server 260 already exists for the client device 220 and the Web page, the information in the entry is downloaded to the client device 220 and inserted in the appropriate fields of the Web page. The user need only send the transmit command to send this information to the Web page server 230. Alternatively, if the user wishes to modify the information in the entry, the user need only enter the new information in the appropriate fields over the information downloaded from the directory server 260. The modified information is then sent to the directory server 260 and stored as an entry in the directory server 260 in the same manner as for a new directory server 260 entry.

The insertion of the directory server 260 entry information into the Web page may be performed based on, for example, the HTML tags that are present in the Web page. For example, when a directory server 260 entry is created, the HTML tags and the associated values for the tags, i.e. the user's input into the fields of the Web page, are stored in correlation to one another in the directory server 260 entry. Thus, there may be a directory server 260 entry consisting of an HTML tag <socsec> that identifies a social security number tag. A corresponding input value is stored in the directory server 260 in association with the <socsec> tag.

When the directory server 260 entry information is retrieved by the client device 220 for insertion into a retrieved Web page, the tags in the directory server 260 entry are matched to the tags in the HTML description of the Web page and the corresponding tag value is inserted into the associated field in the Web page. In this way, the user is relieved of the burden of having to repeatedly enter the same information each time he/she visits a Web page.

Figure 3:
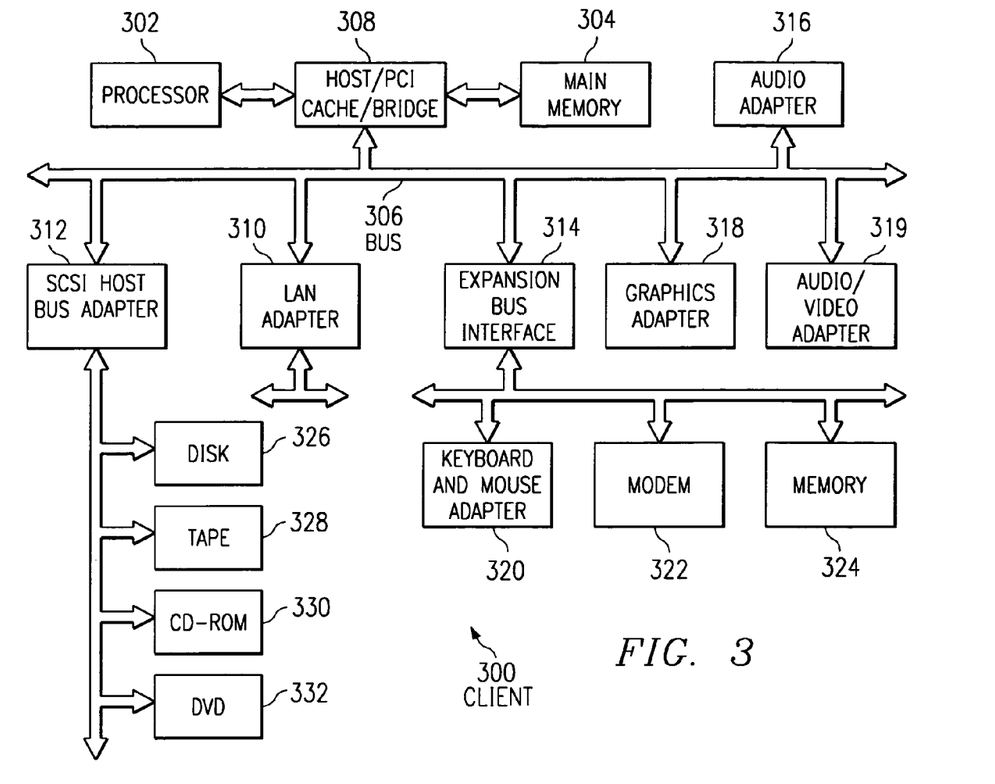
FIG. 3 is an exemplary diagram of a client device according to the present invention.

With reference now to FIG. 3, a block diagram of a data processing system in which the present invention may be implemented is illustrated. Data processing system 300 is an example of a client computer, such as client device 220. Data processing system 300 employs a Peripheral Component Interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, Local Area Network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and Digital Video Disc Read Only Memory drive (DVD-ROM) 332. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The data processing system 300 may communicate with one or more Web page servers, such as Web page servers 230-250, via the LAN adapter 310, the modem 322, or the like. The data processing system utilizes a Web browser program executed by the processor 302, as is generally known in the art, to enter URLs of Web sites and thereby download Web pages from Web page servers.

In addition, the processor 302 executes a background application for communication with a directory server, such as directory server 260. The background application establishes a communication connection with the directory server using, for example, TCP/IP. When a Web page is downloaded from a Web page server, the background application sends a request for directory entry information corresponding to the Web page identifier and the data processing system identification.

In response to receiving a request for directory entry information, the directory server searches the directory listings for an entry matching the particular data processing system identification and the Web page identifier. If an entry is present, the directory entry information is downloaded to the data processing system 300. If an entry is not present, a new entry is created and user inputs into fields of the Web page are transmitted to the directory server 260 via the background application.

Figure 4:
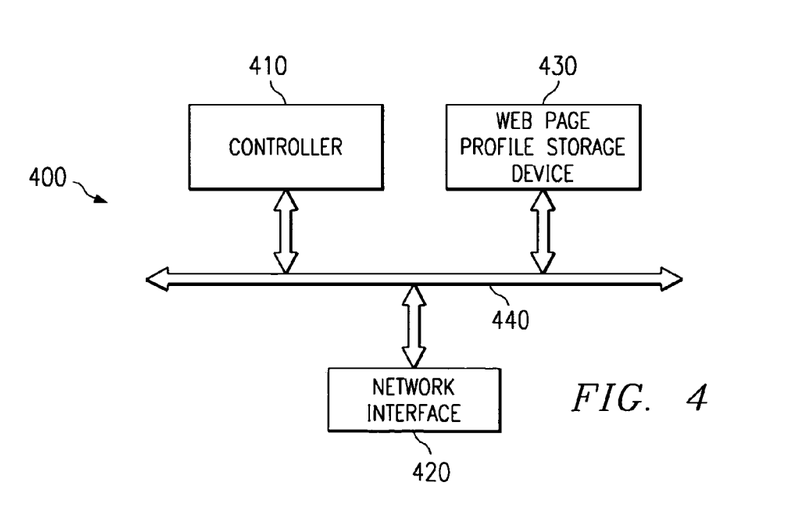
FIG. 4 is an exemplary block diagram of a directory server according to the present invention.

FIG. 4 is an exemplary block diagram of a directory server 400 according to the present invention. As shown in FIG. 4, the directory server 400 includes a controller 410, a network interface 420 and a Web page entry storage device 430. These devices are in communication with one another via the control/signal bus 440. Although a bus architecture is shown in FIG. 4, the invention is not limited to such an architecture. Rather, any architecture that facilitates communication between the elements 410-430 may be used without departing from the spirit and scope of the present invention.

When the controller 410 receives a request for directory information via the network interface 420, the controller initiates a search of the entries in the Web page entry storage device 430. The search is performed based on the requesting data processing system's identification and the Web page identification. If a matching entry is found in the Web page entry storage device 430, the entry information is downloaded to the requesting data processing system via the network interface 420. If a matching entry is not found, the controller 410 sends a "not found" message to the requesting data processing system.

In response to receiving the "not found" message, the background application of the requesting data processing system collects the HTML tags and the corresponding user's input into the Web page and sends this information to the directory server 400 along with an instruction to create a new Web page entry. When the controller 410 receives the instruction from the requesting data processing system, the controller 410 creates a new entry in the Web page entry storage device 430 based on the requesting data processing system's identifier and the Web page identifier. The controller 410 then stores the HTML tags and the corresponding user input into the Web page entry storage device 430 in association with the created Web page entry.

Figure 5:
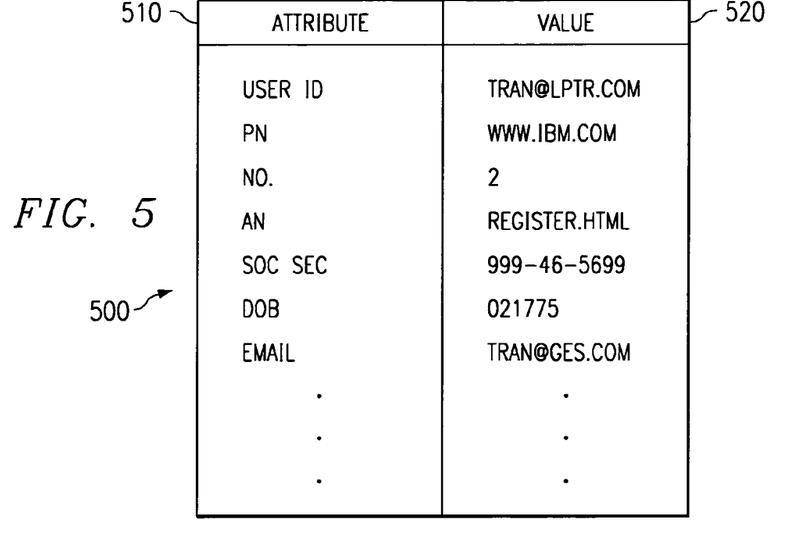
FIG. 5 is an exemplary diagram of a directory server Web page entry according to the present invention.

FIG. 5 is an exemplary diagram illustrating a Web page entry in a directory server. As shown in FIG. 5, the Web page entry includes a plurality of attributes 510 and a plurality of corresponding values 520. The attributes include a user ID, or a data processing system identifier, a page name (pn), a page number (no.), an application name (an), a social security number (socsec), a date of birth (dob), an electronic mail address (email), and the like. The attributes have corresponding values 520 of "tran@lptr.com", "www.ibm-.com", "2", "register.html", "999-46-5699", "021775", and "tran@ges.com". Other attributes may be included in the Web page entry either in addition to or in place of the attributes shown in FIG. 5.

When the directory server performs a search to determine if there is a Web page entry corresponding to requested directory information, the directory server first searches for a user ID corresponding to the identification of the requesting data processing system. If a matching user ID is found, the directory server then searches for those entries matching the user ID that also match the requested Web page name (pn). If a matching entry is found, the corresponding attributes and values are downloaded to the requesting data processing system.

If a corresponding entry is not found during the directory server's search, a new entry is created using the requesting data processing system's identifier as a user ID, and the URL of the requested Web page as the page name (pn), for example. Thereafter, user input to the Web page is received and stored as attribute/value pairs in the Web page entry.

Figure 6:
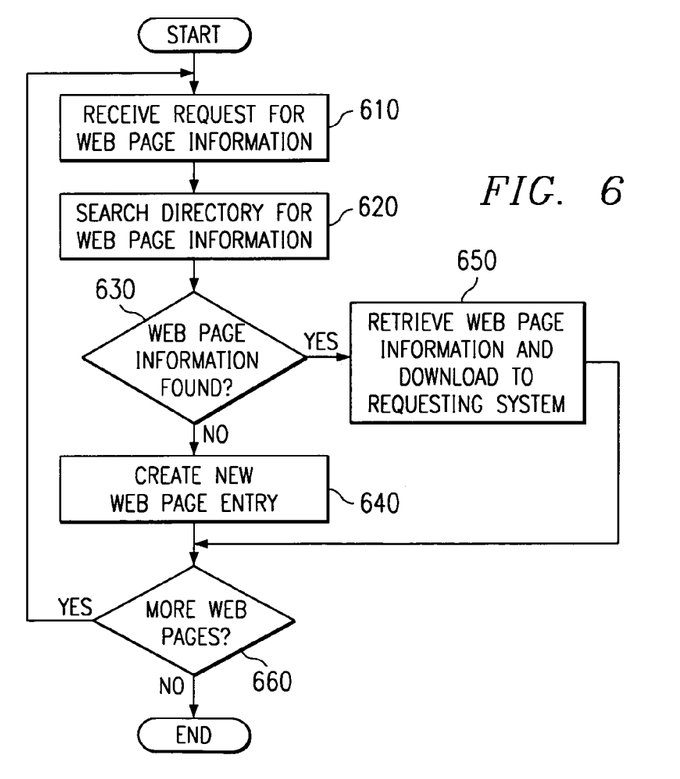
FIG. 6 is a flowchart outlining an exemplary operation of the directory server according to the present invention.

FIG. 6 is a flowchart outlining an exemplary operation of the present invention from the point of view of the directory server. As shown in FIG. 6, the operation starts when a request for Web page information is received from a requesting data processing system (step 610). A search of the directory entries for the requested Web page information is conducted (step 620). A determination is made as to whether a matching Web page entry is found in the directory of entries (step 630). If a matching Web page entry is found in the directory (step 630:YES), the Web page information is downloaded to the requesting data processing system (step 650).

With reference again to step 630, if a matching Web page entry is not found in the directory (step 630:NO), a new Web page entry is created using the identification information for the requesting data processing system and the requested Web page, along with the user's input into the Web page (step 640). Thereafter, a determination is made as to whether there are additional Web pages (step 660). If there are more Web pages (step 660:YES), i.e. the user moves to another Web page using a Web browser, the operation returns to step 610 and repeats the operation. Otherwise, the operation ends.

Figure 7:
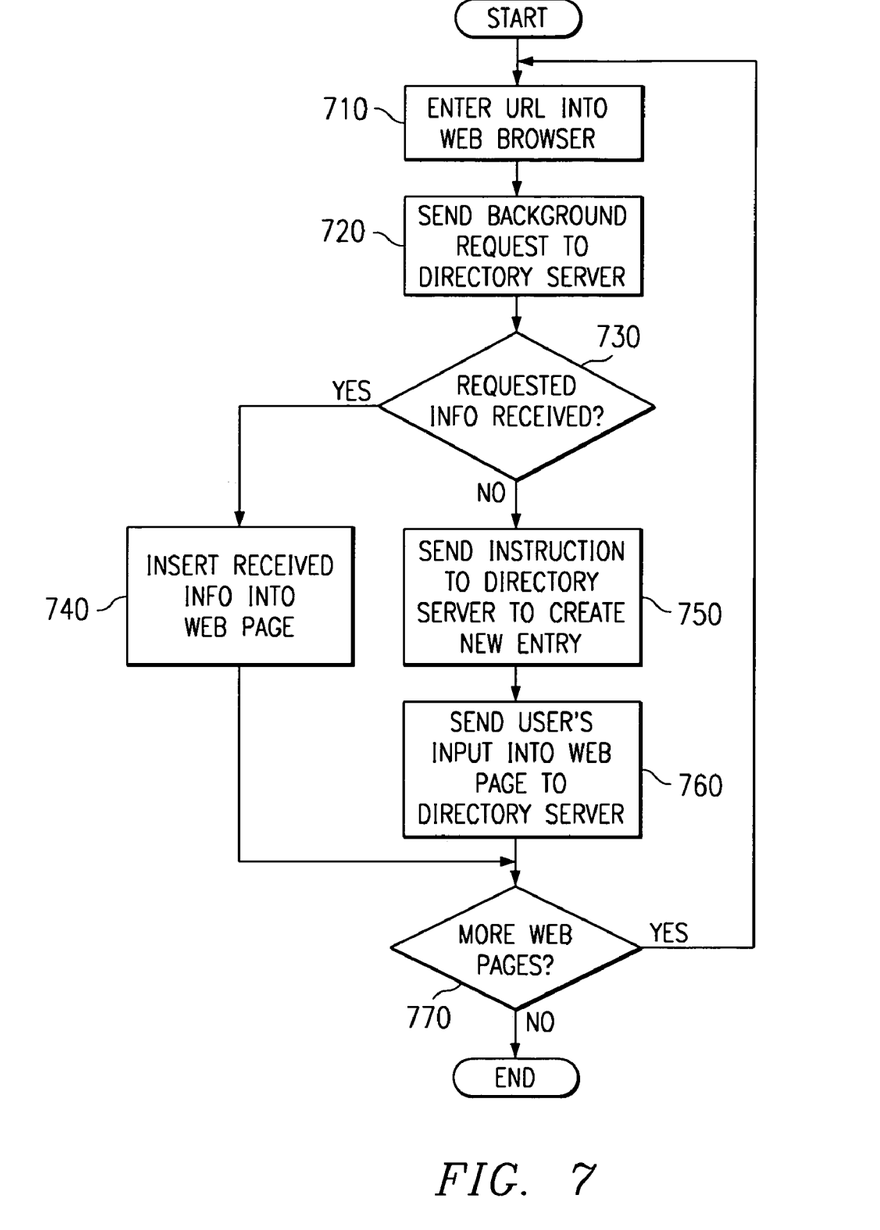
FIG. 7 is a flowchart outlining an exemplary operation of the client device according to the present invention.

FIG. 7 is a flowchart outlining an exemplary operation of the present invention from the point of view of the client device. As shown in FIG. 7, the operation starts with the entry of a URL or other type Web page identifier into a Web browser (step 710). Thereafter, a background request for Web page information is sent to a directory server (step 720).

A determination is made as to whether the requested information is received (step 730). If the requested information is received (step 730:YES), the received information is inserted into the appropriate fields of the requested Web page. If the requested information is not received (step 730:NO), an instruction is sent to the directory server to create a new Web page entry (step 750). Thereafter, the user's input to the requested Web page is also sent to the directory server and stored in the Web page entry (step 760).

Then, a determination is made as to whether there are additional Web pages (step 770). If there are more Web pages (step 770:YES), the operation is continued at step 710. Otherwise, the operation ends.

As discussed above, the present invention may be embodied as a plug-in application to a Web browser or as a separate background application. In one particular embodiment, the present invention may be either a plug-in application or a background application written in the Java programming language. With such an application, two JavaScripts called GetState(Attr) and SetState(Attr, Value) are provided. The SetState(Attr, Value) JavaScript allows the application to store the Web page entry by storing pairs of attributes and corresponding values. The GetState(Attr) JavaScript allows the application to retrieve the attribute values from the directory server in which they are stored accordingly.

Thus, with the present invention, Web page state information is stored in a directory server for use when later accessing a Web page again. In this way, Web page state information is not lost when the user decides to move from Web page to Web page. Furthermore, the user is freed from having to repeatedly input the same information each time he/she accesses a particular Web page. In addition, the information stored in the directory server may be encrypted for greater security. Because all Web browser programs are HTML compatible and the attribute and value information are stored based on HTML tags, the Web page entry is compatible with all Web browsers regardless of the particular Web browser used when the Web page entry was created.

In another embodiment of the present invention, the user's personal information is not stored for each individual Web page visited by the user. Rather, a master directory listing is provided that contains attributes and associated values that are commonly required by a plurality of Web pages. This master directory listing may include such information as the user's name, address, date of birth, age, marital status, and the like.

The master directory listing may be stored in place of or in addition to individual Web page directory listings. The individual Web page directory listings include all information requested by the Web page that is not already stored in the master directory listing. In this way, when a Web page directory listing is downloaded to a requesting data processing system, the master directory listing is also downloaded. Proper insertion of the various information is achieved by matching HTML tags to insert the appropriate information. Thus, storage space requirements of the directory server are reduced.

Although the above embodiments are directed to the use of HTML Web pages and the use of the World Wide Web, the invention is not limited to such embodiments. Rather, the present invention is applicable to other Internet resources for transferring information, such as File Transfer Protocol (FTP) and Gopher.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for maintaining state information for Web pages, comprising:
   receiving user input to a Web page via a Web browser at a client device;
   sending an instruction to store user input and a Web page field identifier in a directory server from a background application running on the client device;
   storing the user input and a corresponding Web page identifier in the directory server; and
   in response to receiving a user request, via the Web browser, for the Web page, sending a request from the background application running on the client device to the directory server to retrieve the user input and corresponding Web page field identifier, wherein the user input and corresponding Web page field identifier are retrieved from the directory server.

2. The method of claim 1, wherein the user input and Web page field identifier are specific to a particular Web page.

3. The method of claim 1, wherein the user input and Web page field identifier are common to a plurality of Web pages.

4. The method of claim 1, further comprising:
   matching the Web page field identifier to an entry field identifier located in the Web page; and
   inserting the user input into a field associated with the entry field identifier.

5. The method of claim 1, further comprising:
   receiving a Web page retrieval request having a Web page identifier identifying the Web page from a Web browser running on the client device;
   sending the Web page identifier to the directory server from the background application running on the client device; and
   receiving the user input and Web page field identifier from the directory server in response to sending the Web page identifier from the background application running on the client device.

6. The method of claim 5, further comprising inserting the user input into a field of the Web page corresponding to the Web page field identifier.

7. The method of claim 1, wherein the user input and the Web page field identifier are stored in a Web page entry of the directory server identified by a user identifier and a Web page identifier.

8. The method of claim 1, wherein the user input is encrypted before being stored in the directory server.

9. The method of claim 1, wherein the Web page field identifier is a HyperText Mark-up Language tag.

10. The method of claim 1, wherein the directory server is an LDAP server.

11. The method of claim 1, wherein the method is implemented using a plug-in application to a Web browser.

12. A computer program product in a computer readable medium for maintaining state information for Web pages, comprising:
   first instructions for receiving user input to a Web page via a Web browser at a client device;
   second instructions for sending an instruction to store user input and a Web page field identifier in a directory server from a background application running on the client device;
   third instructions for storing the user input and a corresponding Web page identifier in the directory server; and
   fourth instructions for sending a request from the background application running on the client device to the directory server to retrieve the user input and corresponding Web page field identifier, in response to receiving a user request, via the Web browser, for the Web page, wherein the user input and corresponding Web page field identifier are retrieved from the directory server.

13. The computer program product of claim 12, wherein the user input and Web page field identifier are specific to a particular Web page.

14. The computer program product of claim 12, wherein the user input and Web page field identifier are common to a plurality of Web pages.

15. The computer program product of claim 12, further comprising:
   fifth instructions for matching the Web page field identifier to an entry field identifier located in the Web page; and
   sixth instructions for inserting the user input into a field associated with the entry field identifier.

16. The computer program product of claim 12, further comprising:
   fifth instructions for receiving a Web page retrieval request having a Web page identifier identifying the Web page from a Web browser running on the client device;
   sixth instruction for sending the Web page identifier to the directory server from the background application running on the client device; and
   seventh instructions for receiving the user input and Web page field identifier from the directory server in response to sending the Web page identifier from the background application running on the client device.

17. The computer program product of claim 16, further comprising eighth instructions for inserting the user input into a field of the Web page corresponding to the Web page field identifier.

18. The computer program product of claim 16, further comprising eighth instructions for inserting the user input into a field of the web page corresponding to the Web page field identifier.

19. An apparatus for maintaining state information for Web pages, comprising:
   a processor;
   an input device coupled to the processor; and
   a network interface coupled to the processor and to a network, wherein the processor receives user input to a Web page via a Web browser at a client device, sends an instruction from a background application running on the client device to a directory server, via the network interface, to store the user input and a corresponding Web page field identifier in the directory server, and sends a request from the background application running on the client device to the directory server to retrieve the user input and corresponding Web page field identifier, in response to receiving a user request via the Web browser, for the Web page, wherein the user input and corresponding Web page field identifier are retrieved from the directory server.

20. The apparatus of claim 19, wherein the user input and Web page field identifier are specific to a particular Web page.

21. The apparatus of claim 19, wherein the user input and Web page field identifier are common to a plurality of Web pages.

22. The apparatus of claim 19, wherein the processor matches the Web page field identifier to an entry field identifier located in the Web page and inserts the user input into a field associated with the entry field identifier.

23. The apparatus of claim 19, wherein the processor receives a Web page retrieval request having a Web page identifier identifying the Web page from a Web browser running on the client device via the input device, sends the Web page identifier from the background application running on the client device to the directory server via the network interface, and receives the user input and Web page field identifier from the directory server in response to sending the Web page identifier from the background application running on the client device via the network interface.

24. The apparatus of claim 23, wherein the processor inserts the user input into a field of the Web page corresponding to the Web page field identifier.

25. The apparatus of claim 19, wherein the user input and the Web page field identifier are stored in a Web page entry of the directory server identified by a user identifier and a Web page identifier.

26. The apparatus of claim 19, wherein the processor encrypts the user input before the user input is stored in the directory server.

27. A method, in a directory server, for maintaining state information for Web pages, comprising:
   receiving user input to a Web page from a background application running on a client device; and
   storing the user input and a corresponding Web page field identifier received from the background application running on the client device in the directory server, wherein the user input and corresponding Web page field identifier are downloaded from the directory server to the client device in response to a user request for a Web page.

28. The method of claim 27, wherein the user input and Web page field identifier are specific to a particular Web page.

29. The method of claim 27, wherein the user input and Web page field identifier are common to a plurality of Web pages.

30. The method of claim 27, further comprising:
   receiving, from the background application running on the client device, a Web page identifier identifying the Web page;
   retrieving the user input and Web page field identifier in response to receiving the Web page identifier; and
   sending the user input and Web page field identifier to the background application running on the client device from the directory server.

31. The method of claim 27, wherein the user input and the Web page field identifier are stored as a Web page entry identified by a user identifier and a Web page identifier.

32. The method of claim 27, wherein the user input is encrypted before being stored.

33. The method of claim 27, wherein the Web page field identifier is a HyperText Mark-up Language tag.

34. The method of claim 27, wherein the directory server is an LDAP server.

35. A method in a data processing system for maintaining state information for a Web page, the method comprising:
    receiving a user input to the Web page and an identifier associated with the user input via a Web browser at a client;
    sending an instruction from a background application running on the client to store user input to the Web page and the identifier associated with the user input; and
    storing the user input to the Web page and the identifier associated with the user input in a server; and
    responsive to a subsequent request via the Web browser for the Web page, sending a request from the background application running on the client to the server to retrieve the user input and the identifier from the server.

36. The method of claim 35, wherein the server is a directory server.

37. The method of claim 35, wherein the identifier is a tag from the Web page.

38. The method of claim 35, further comprising:
    Placing the user input retrieved from the server in the Web page using the identifier.

* * * * *